United States Patent
Genies et al.

(10) Patent No.: US 10,020,546 B2
(45) Date of Patent: Jul. 10, 2018

(54) DEVICE FOR MANAGING AN ACCUMULATOR

(71) Applicant: COMMISSARIAT A L'ENERGIE ATOMIQUE ET AUX ENERGIES ALTERNATIVES, Paris (FR)

(72) Inventors: Sylvie Genies, St Egreve (FR); Melanie Alias, Poligny (FR); Caroline Coutier, Grenoble (FR); Estelle Le Baron, Barraux (FR); Sophie Mailley, Le Pin (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 272 days.

(21) Appl. No.: 14/786,853

(22) PCT Filed: Apr. 23, 2014

(86) PCT No.: PCT/EP2014/058247
§ 371 (c)(1),
(2) Date: Oct. 23, 2015

(87) PCT Pub. No.: WO2014/173956
PCT Pub. Date: Oct. 30, 2014

(65) Prior Publication Data
US 2016/0072158 A1    Mar. 10, 2016

(30) Foreign Application Priority Data

Apr. 23, 2013    (FR) ...................................... 13 53708

(51) Int. Cl.
*H01H 35/00*    (2006.01)
*H01M 10/48*    (2006.01)
(Continued)

(52) U.S. Cl.
CPC ......... *H01M 10/48* (2013.01); *H01M 10/482* (2013.01); *H01M 2/345* (2013.01);
(Continued)

(58) Field of Classification Search
CPC ......... H01M 2010/4271; H01M 2/345; H01M 10/052; H01M 2200/20
(Continued)

(56) References Cited

U.S. PATENT DOCUMENTS 3,474,237 A * 10/1969 Hastings ................. G01L 1/225
702/42
5,508,676 A    4/1996 Grange et al.
(Continued)

FOREIGN PATENT DOCUMENTS

DE    10 2010 013 017 A1    9/2011
FR    2 693 795 A1    1/1994
(Continued)

OTHER PUBLICATIONS

Machine translation of DE 10 2010013017 A1; Mar. 2010.*
(Continued)

*Primary Examiner* — Jared Fureman
*Assistant Examiner* — Duc M Pham
(74) *Attorney, Agent, or Firm* — Oblon, McClelland, Maier & Neustadt, L.L.P.

(57) ABSTRACT

A device for managing an accumulator, including: a plurality of strain gauges including at least three strain gauges, the strain gauges being arranged to measure stresses along at least three distinct stress axes; a measuring device measuring strains undergone by each gauge along its stress axis; a reversible electrical switch; a calculating device controlling opening and closing of the electrical switch, depending on measurements carried out by the measuring device.

12 Claims, 10 Drawing Sheets

(51) Int. Cl.
*H01M 2/34* (2006.01)
*H01M 10/052* (2010.01)
*H01M 10/42* (2006.01)

(52) U.S. Cl.
CPC ........ *H01M 10/052* (2013.01); *H01M 10/425* (2013.01); *H01M 2010/4271* (2013.01); *H01M 2200/20* (2013.01)

(58) Field of Classification Search
USPC .......................................................... 307/119
See application file for complete search history.

(56) References Cited

U.S. PATENT DOCUMENTS

| | | | |
|---|---|---|---|
| 6,407,553 | B1 | 6/2002 | Anderson et al. |
| 8,726,738 | B2 | 5/2014 | Grange |
| 2002/0119364 | A1* | 8/2002 | Bushong ............. H01M 2/0421 429/61 |
| 2011/0165468 | A1 | 7/2011 | Alias et al. |
| 2012/0286739 | A1* | 11/2012 | O'Brien, Jr. ........ H01M 2/1077 320/134 |
| 2014/0287317 | A1 | 9/2014 | Tiquet et al. |
| 2015/0125762 | A1 | 5/2015 | Gayot et al. |

FOREIGN PATENT DOCUMENTS

| | | |
|---|---|---|
| FR | 2 944 865 A1 | 10/2010 |
| JP | 58-34577 A | 3/1983 |
| JP | 63-268445 A | 11/1988 |
| JP | 5-152003 A | 6/1993 |
| JP | 2004-87168 A | 3/2004 |
| JP | 2004-508659 A | 3/2004 |
| JP | 2008-109742 A | 5/2008 |
| JP | 2010-86911 A | 4/2010 |
| JP | 2012-234629 A | 11/2012 |
| KR | 10-2008-0109121 A | 12/2008 |
| WO | 94/02815 A1 | 2/1994 |
| WO | 2011/072295 A2 | 6/2011 |

OTHER PUBLICATIONS

"General Purpose Strain Gages—Rectangular Rosette 125LR," Vishay Precision Group, Feb. 2, 2010, 2 pages.
Peyman Taheri, et al., "Investigating electrical contact resistance losses in lithium-ion battery assemblies for hybrid and electric vehicles," Journal of Power Sources, vol. 196, 2011, pp. 6525-6533.
Pankaj Arora, et al., "Battery Separators," Chem. Rev., vol. 104, 2004, pp. 4419-4462.
Zonghai Chen, et al., "Redox shuttles for safer lithium-ion batteries," Electrochimica Acta, vol. 54, 2009, pp. 5605-5613.
D. V. Safronov, et al., "Lithium Intercalation and Deintercalation Processes in $Li_4Ti_5O_{12}$ and $LiFePO_4$," Inorganic Materials, vol. 48, No. 1, 2012, pp. 57-61.
International Search Report dated Aug. 5, 2014 in PCT/EP2014/058247 filed Apr. 23, 2014.
French Preliminary Search Report dated Dec. 11, 2013 in FR 1353708 filed Apr. 23, 2013.
Japanese Office Action dated Sep. 19, 2017 in Patent Application No. 2016-509449 (with English translation).

* cited by examiner

DEVICE FOR MANAGING AN ACCUMULATOR

TECHNICAL FIELD

The present application belongs to the technical field of electrochemical generators. The invention more particularly relates to a device and a method for using the same, enabling an accumulator to be monitored and followed up during the use thereof. In other words, the invention is directed to the technical field associated with the management of the operation of an electrochemical accumulator.

STATE OF PRIOR ART

Within the scope of the present application, the term accumulator designates an electrochemical cell comprised of a positive electrode and a negative electrode, separated by a separator, the whole being in contact with an electrolyte.

The accumulator is insulated from the outside environment by a cover which can be open, partially impermeable or perfectly impermeable depending on the technology considered and the electrochemical mechanisms implemented. The materials and additives, some of which can be pollutant or toxic, are thus contained in a compartment without the risk of contaminating the outside environment. The whole consequently forms a unit object which will be called an element hereinbelow. For practical reasons and in order to increase the energy of the storage system considered, several accumulator elements are gathered in a second cover so as to form a battery or module, or even a pack. The module or pack can contain several accumulators connected in series and/or in parallel.

There are different types of accumulators characterized by the chemical elements making them up. For example, when an accumulator includes a cathode and an anode allowing the reversible incorporation and de-incorporation of lithium ions (by insertion or conversion mechanisms, in a metal to form an alloy), the accumulator is of the lithium-ion type or more generally called a lithium accumulator. More precisely, a lithium-ion accumulator can include a negative electrode (a cathode during the discharging process) composed of graphite carbon or a metal alloy, having possibly nanoscale dimensions, composed of silicon or tin, or even a $Li_4Ti_5O_{12}$ spinel-type lithiated titanium oxide. The cathode (anode during the discharging process) can for example include transition metal oxides comprising cobalt ($LiCoO_2$), and/or manganese ($LiMn_2O_4$) and/or nickel ($Li(Co,Ni,Mn)O_2$) or lithiated iron phosphate ($LiFePO_4$). The reversible exchange of lithium ions between the positive electrode and the negative electrode is consequently possible, the lithium ions released by the cathode upon discharging are incorporated to the anode, the reverse reactions occurring upon charging. The electrodes are dipped in an organic solution, generally comprised of anhydrous aprotic organic solvents, wherein a lithium salt is dissolved. The presence of an organic electrolyte is required because of the sensitivity of the components (active materials, lithium salts) to water, this implies a behaviour at the end of charging the lithium accumulator which is different from the aqueous electrolytes as explained further in the text.

The elements making up a lithium electrochemical cell can be arranged in different ways. For example, these different elements can be superimposed with each other so as to form a prism or cylinder. A cylindrical shape accumulator can be obtained by winding an electrochemical cell on itself. Possibly, this winding can comprise a centre core on which the electrochemical cell is wound. The centre core or mandrel can be of the metal or plastic type. The hermetic cover enabling the components of the electrochemical cell to be insulated from the outside environment can be flexible and heat-sealed or even rigid so as to form a rigid case the ends and edges of which are welded. A cover can thus be comprised of stainless steel or aluminium-type plastic or metal materials.

The normal use of a lithium accumulator comprises charge (or charging) and discharge (or discharging) cycles of the electrochemical cell. Lithium ions reversibly migrate or are inserted in the materials comprising the electrodes during these cycles, more precisely, the electrodes undergo oxidation or reduction reactions modifying their crystalline structure and volume during these cycles. Depending on the deformations undergone by the electrodes, it is possible to know whether the accumulator is in a charging or discharging process. "State of charge" is also used to characterize these cycles.

The lithium accumulators are distinguished from other types of accumulators by their non-tolerance to electrical overcharging or overdischarging phenomena. Indeed, a lithium electrochemical cell comprises an organic electrolyte which, unlike an aqueous electrolyte, does not allow to consume, through the existence of a secondary reaction, an overcharge current appearing in the accumulator during a too long or abnormal charging cycle. An aqueous electrolyte allows the consumption of such an overcharge current by the conventional water electrolysis reaction, that is by a formation of oxygen at the positive electrode and a formation of hydrogen at the negative electrode, by water oxidation and reduction respectively. For lithium accumulators, except for the introduction of specific additives, no secondary and reversible electrochemical reaction can occur at the organic electrolyte to consume part of the overcharge current. The overcharge current degrades consequently the crystalline structures of the electrode materials in which the lithium is incorporated and the electrolyte in gaseous form. The gas thus formed is confined in the pack cover, thus increasing its internal pressure. Too high an overcharge current can thus cause the deflagration of the cover which insulates the accumulator from its outside environment. In case of an electrical overdischarge, the surface layer protecting the graphite electrode is decomposed in gas form, and an overlithiation phenomenon takes place at the positive electrode causing an increase in its volume. An overdischarge of an accumulator can thus cause the same effects as an overcharge. The electrical overcharge phenomena can also cause a thermal runaway of the accumulator that can cause these components and/or the protecting cover to melt. In order to prevent these irreversible degradations of the pack, it is necessary to know the permissible limits of a charging and discharging cycle for a lithium accumulator. In other words, it is necessary to know from which electrical current values a lithium accumulator is in an overcharge or overdischarge state. These states are referred to as the term "safety state".

The components of a lithium accumulator are also degraded in gas form, during its use and aging. The gas thus formed is much slowly and gradually released than when the accumulator is in a safety state. As above, the accumulator aging can cause an explosion of the pack or a thermal runaway of the accumulator. Indeed, an accumulator advanced aging can degrade the electrodes in an inhomogeneous way and modify the lithium incorporation properties at one of the electrodes. The electrochemical reaction can thus be unbalanced at the electrodes and cause thermal runaway of the accumulator.

For safety reasons, it is also necessary to know the aging state of the accumulator, which is also called the "state of health".

There are different devices enabling one of the above-mentioned states of a pack to be known or detected.

For example, to prevent a pack from being in a safety state, a relief valve can be connected to the pack cover. Hence, when the pressure inside the cover exceeds a critical value, the valve emits into the outside environment the gas contained in the cover. This solution is extreme because on the one hand, it releases in the environment noxious chemical compounds which were desired to be confined in the cover and on the other hand the accumulator is no longer usable because the impermeability of the cover is irreversibly broken.

The risk of pack deflagration or explosion can also be restricted by the use of a thermal fuse, enabling the electrochemical cells present in a same pack to be disabled, when the pack temperature exceeds a critical value which is between 30° C. and 50° C. above its normal operating temperature. Once the thermal fuse is activated, the electrical connections between the accumulators and their outside environment are irreversibly switched off. Another drawback related to this solution is the space occupied by the thermal fuse inside the pack. Furthermore, care should also be taken to minimize contact resistances at the electrical connections when additional thermal fuses are added at the pack ("Investigating electrical contact resistance losses in lithium-ion battery assemblies for hybrid and electric vehicles", P. Taheri, S. Hsieh, M. Bahrami, Journal of Power Sources, 196 (2011) 6525-6533). In other words, the presence of one or more thermal fuses in a pack increases the risks of the pack failure and increases the cover volume to insulate the electrochemical cells from their outside environment.

According to another alternative, separating elements (or "shutdown") can be placed inside a pack. A separating element includes three films of polymers. The centre film of polyethylene has a lower melting point than the two other peripheral films of polypropylene. The peripheral films undergo at about 110° C. a clogging of their porosity, they act thereby as a "chemical cut-off switch". The centre film, more stable in temperature, enables the physical separation between electrodes to be held. When the internal temperature of the pack exceeds a critical value between 80° C. and 180° C., the pack does not deliver and does not receive any electrical current any longer. Beyond 180° C., the films of polymer lose their mechanical integrity and result in short circuiting the electrodes ("Battery Separators", P. Arora, Z. Zhang, Chem. Rev., 104 (2004) 4419-4462). As well as for the devices above, separating elements irreversibly degrade the pack when the same is in a safety state. In other words, it is no longer possible to use the pack after triggering this safety device.

Another solution to prevent a pack from being used in a safety state, consists in placing additives, called Redox shuttle molecules, at the electrolyte of an electrochemical cell, capable of being oxidized instead of the material making up the positive electrode, during an overcharging of the accumulator. These molecules absorb excess charges injected into the pack upon overcharging and thus block the cathode potential to the oxidation potential of the REDOX molecules until the end of overcharging ("Redox shuttles for safer lithium-ion batteries", Z. Chen, Y. Qin, K. Amine, Electrochimica Acta, 54 (2009) 5605-5613).

According to another solution, the state of health of a pack can be monitored by measuring and following up the electric voltage at the terminals thereof.

For this, the variation in voltage should be sufficiently high to be detected. Yet, in a pack consisting of several accumulators, this measurement is extended to all the accumulators contained in the pack. Hence, the overcharge of an accumulator cannot be detected from several accumulators operating normally. On the other hand, the measurement of the electric voltage at the terminals of the pack can be unable to provide reliable information insofar as the electric voltage measured is not specific to a value of the state of charge. This is for example the case when accumulators have the same potential on a wide field of state of charge. There can be mentioned the case of the $LiFePO_4/Li_4Ti_5O_{12}$ accumulator the two active materials $LiFePO_4$ and $Li_4Ti_5O_{12}$ of which both have a flat potential curve with a wide plateau. The voltage variation of such an accumulator is thus nearly invariant on a wide range of state of charge, the voltage value is thus not specific to the state of charge of the element ("Lithium Intercalation and Deintercalation Processes in $Li_4Ti_5O_{12}$ and $LiFePO_4$", D. V. Safronov, S. A. Novikova, A. M. Skundin, and A. B. Yaroslavtsev, Inorganic Materials, 2012, Vol. 48, No. 1, pp. 57-61). This results in complexifying the balancing of the inter-element state of charge, based on the measurement of the voltage difference between each element. Furthermore, the operating conditions of the pack (value of the electrical current at the terminals of the pack, internal temperature) can modify the pack behaviour and thus disturb interpretation of the measurements. The accumulator can hence be in an undetected safety state.

Strain gauges can also be employed to know the state of charge of a pool of accumulators.

For example, document U.S. Pat. No. 6,407,553 mentions the use of two strain gauges (24, 26) or four strain gauges (40, 42, 44, 46), respectively bonded to the surface of a pack (22) or (48) comprising several accumulators (FIGS. 2 and 8 of said document). From measurements carried out by said gauges, it is then possible to know the state of charge of the pack (22, 48).

Figure 1:
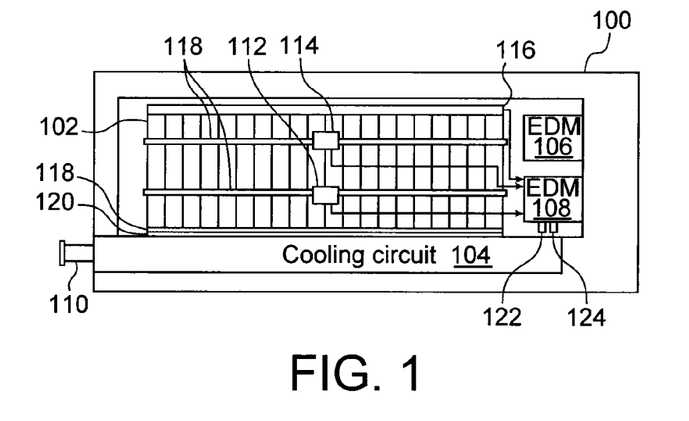
FIG. 1 represents the FIG. 1 of document WO2011/072295.
Figure 2:
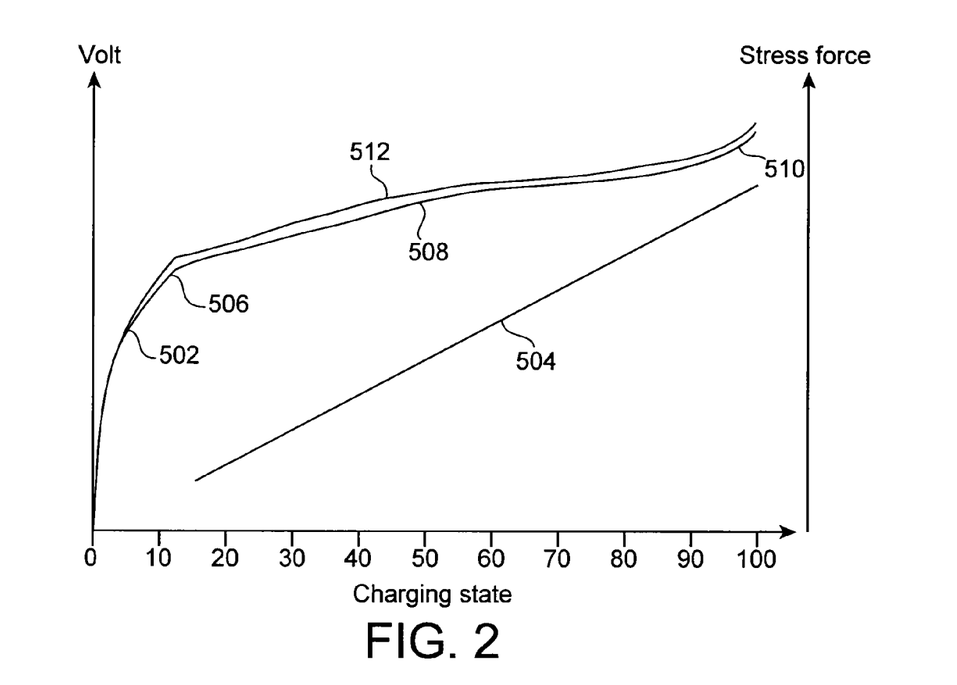
FIG. 2 represents the FIG. 5 of document WO2011/072295.
Figure 3:
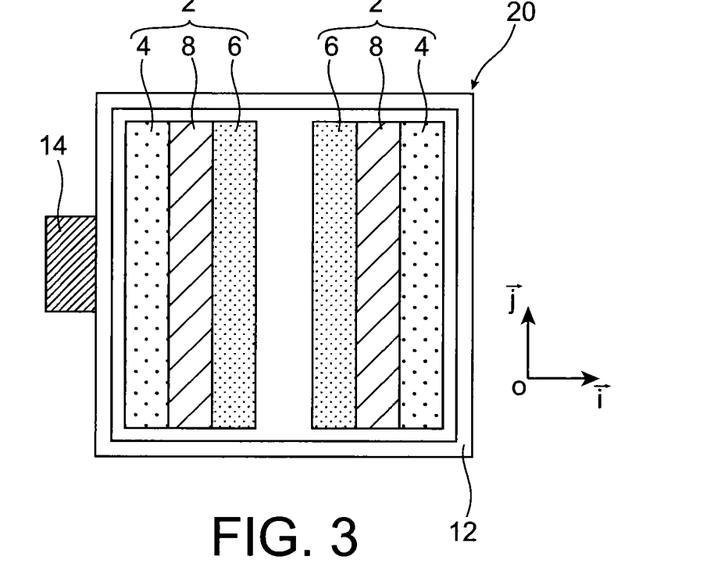
FIG. 3 represents a profile cross-section with a plurality of strain gauges attached to the cover of a lithium accumulator without a mandrel within a pack.

According to another example, document WO2011/072295 mentions several lithium accumulators (102) held together through a tape (118) comprising a strain gauge (114) (FIG. 1). The strain gauge enables the volume variation of the pool of accumulators to be measured, through deformations of the tape (118). From these measurements, it is possible to know the state of charge, safety and health of all the accumulators (102). FIG. 2 hereinbelow corresponds to FIG. 5 of document WO2011/072295, this figure clearly shows that the measurements (504) carried out by the strain gauge (118) are insufficient to detect a minimum charging value for all the accumulators (paragraphs [036, 038]). For this, it is necessary to complete these measurements with voltage measurements carried out at the terminals of the accumulators.

Lithium accumulators are sensitive technologies which require stringent management and monitoring of their state of charge to prevent them from being used in a safety state, to enable them to be employed in optimum conditions securely. For this, it is sought to be able to monitor the state of charge and know the state of health of an accumulator. One of the purposes of the present application is thus to provide a device, as well as a method for the use thereof, enabling an accumulator's state of charge to be monitored and state of health to be known.

DISCLOSURE OF THE INVENTION

An aim of the invention is to provide a solution to the abovementioned problems.

The invention relates to a device for managing an accumulator, including:
- a plurality of strain gauges including at least three strain gauges, the strain gauges being arranged so as to measure stresses along at least three distinct stress axes;
- a measuring device for measuring the strains undergone by each gauge along its stress axis;
- a reversible electrical switch;
- a calculating device controlling, or specifically programmed to control, opening and closing of the electrical switch, depending on the measurements carried out by the measuring device.

The term stress axis defines the axis along which a strain gauge measures the mechanical strains it undergoes.

The switch enables a device to be electrically connected to and/or disconnected from its client environment. The client environment designates all the conductive elements electrically connected to said device and likely to electrically charge and/or discharge the device, for example an accumulator.

The calculating device can include a storage device comprising a first series of values and a second series of values different from the first series of values. The calculating device can control closing the electrical switch when the measurements carried out by the measuring device belong to the first series of values, or opening the electrical switch when the measurements carried out by the measuring device belong to the second series of values.

The calculating device can implement an algorithm including a step of calculating the elongation-contraction (or traction-compression) of the strain gauges measured with respect to their initial state. The calculating device can include a microprocessor coupled to a storage memory. The calculating device can for example be a computer.

The calculating device can implement an algorithm identifying the calculation result of the evolution of the stresses, which are measured by the plurality of strain gauges, in the first series of values or in the second series of values stored by the calculating device.

The step of calculating the evolution of the stresses can comprise calculating the abscissa ($d(t)$) and the radius ($r(t)$) of the Mohr circle at a time t.

Possibly, the calculating device can include a displaying device for displaying the calculated values of d(t) and r(t). The couple of values (d(t); r(t)) can be represented as a function f(t), drawn in an orthogonal reference frame, wherein the values d(t) correspond to the abscissa and the values r(t) to the ordinates.

The plurality of strain gauges can be held in contact with the cover of the accumulator, including the connection terminals having an opposite polarity for the exit and entrance of the electric current, such that the strain gauges measure the mechanical stresses exerted on the cover. Depending on the accumulator technologies considered, the cover can be hermetic so as to contain at least one accumulator contained in said cover in an impermeable way.

The plurality of strain gauges can be held, attached or bonded to one or more outer faces of the cover, an inner face is a face facing the accumulator. Conversely, the strain gauges can be positioned in the cover that is attached against an inner face of the cover or against one element of the accumulator. The positioning of the gauges is optimized to measure stresses undergone by the cover or the accumulator making up the pack, with a signal having a maximum amplitude. The locations of the gauges to be favoured are in the zones where the element has a maximum strain, either on the middle zone at half the height of the bases for a cylindrical element, or on the zones through which the diagonal straight lines of a prismatic element pass, in proximity of the angles.

A connection terminal of the accumulator, contained in its cover, and accessible on the cover can be connected to the electrical switch belonging to the managing device, and to at least one connection terminal of another accumulator, itself contained in its own cover. Possibly, a connecting terminal of the accumulator can be connected to the connection terminal having a same polarity of several other accumulators contained in their own cover. The assembly of accumulators thus made can be gathered in a second cover with two connection terminals of each negative and positive polarity present on said cover.

The accumulator can be prismatic or cylindrical in shape, possibly wound about a mandrel. The accumulator can be a lithium accumulator, or an accumulator of a nickel cadmium or nickel-metal hydride technology of an equivalent design (cylindrical, prismatic).

The present application also relates to a pack comprising a cover containing at least two accumulators as mentioned above. Each accumulator contained in the pack can include its own managing device.

The invention also relates to a method for calibrating a managing device described above, comprising a step of recording a first series of measurements, on the storage device of the calculating device, said measurements being carried out by the measuring device, upon charging and discharging an accumulator, so as to maintain the integrity of the accumulator.

The calibrating method can also include a step of recording a second series of measurements, on the storage device of the calculating device, said measurements being carried out by the measuring device, upon charging and discharging an accumulator, so as to prevent an irreversible damage of the integrity of the accumulator.

In other words, the values belonging to the first series of measurements can be associated with a state of charge. The values belonging to the second series of measurements can be associated with a state of health or a state of advanced aging.

Once the managing device is calibrated, it can be attached on a pack similar or identical to the pack above, so as to be able to optimally manage the use of the pack.

In other words, the invention relates to a managing device and a method for calibrating the same, relaying on the coupled use of strain gauges positioned in favoured orientations. The measurements of the strain gauges are then correlated to each other in order to identify the state of charge or safety state and/or aging state of the pack. The managing device advantageously enables one of the preceding states of a pack similar or identical to the control pack to be known in real time. Depending on the state of the pack, the managing device reversibly enables the pack to be connected to or disconnected from its client environment in order to maintain its integrity.

Advantageously, a managing device enables the operation or use of a pack comprising an accumulator to be managed. It is also possible to accurately know the state of each accumulator making up a pack comprising several accumulators.

BRIEF DESCRIPTION OF THE DRAWINGS

Further details and characteristics of the invention will appear upon reading the description that follows, made with regard to the following appended figures. Identical, similar, or equivalent parts for the different figures bear the same reference numerals so as to facilitate switching from one figure to another. The different parts represented in the figures are not necessarily drawn to a uniform scale, to make the figures more legible.

DETAILED DISCLOSURE OF PARTICULAR EMBODIMENTS

The invention relates to a managing device for monitoring the state of charge and safety (with the meaning already defined above) of a pack comprising a lithium accumulator, and enabling the state of aging of said pack to be known in real time. An exemplary embodiment of a managing device is described in a first part of the present disclosure. In a second part, an exemplary method for calibrating and using the managing device, enabling a pack to be optimally used is described. These two exemplary embodiments are completed with several alternatives or variants which can be combined together to form new embodiments.

The first part of the detailed disclosure thus relates to an exemplary managing device enabling the state of charge or safety, as well as the state of health, of a pack 20 comprising a single lithium accumulator, to be followed up in real time. In order to aid the reader in understanding the invention, the managing device 100 is represented attached to the pack 20, but the managing device does not necessarily include the pack 20.

In one example, the pack 20 comprises a lithium accumulator 2 cylindrical in shape. The accumulator is of the $LiFePO_4$/graphite type and includes a cathode 4 and an anode 6 separated by a separating element 8. The accumulator is wound on itself so as to form a hollow cylinder. The accumulator is insulated from its environment by a sealed cover 12, of aluminium. The cover matches the accumulator shape, it is thus also of a cylindrical shape. The accumulator can for example be the one marketed under the trademark "A123Systems", under the reference ANR26650-M1 (see above). The dimensions of the pack 20 are a length of 65 mm along the direction (0; j) and a diameter of 26 mm along the direction (0; i), for a weight of 70 g.

Figure 4A:
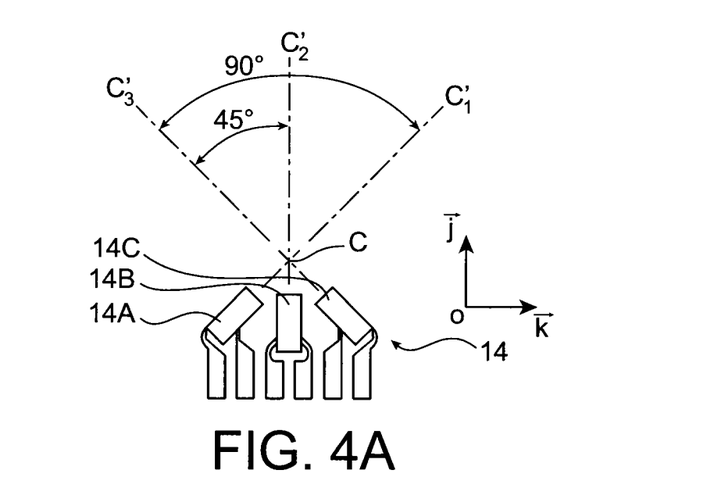
FIGS. 4A to 4C represent several devices of strain gauges.

The managing device 100 includes a plurality of strain gauges 14, each gauge being attached or held on an outer face of the cover 12, the inner face of the cover being the face facing the accumulator 2. Preferably, the strain gauges 14 are attached on a bulging part of the pack 20, advantageously at half the length said pack. These strain gauges 14 include a first strain gauge 14A, a second strain gauge 14B and a third strain gauge 14C (FIG. 4A). The strain gauges are numbered as a function of their respective position on the cover and according to the trigonometric rotation direction, in order to simplify processing of their measurements. All the three strain gauges are not aligned and arranged so as to be able to measure the stresses of the cover 12 along three distinct directions or stress axes. According to one example, the first strain gauge 14A is positioned such that its stress axis ($CC'_1$) is perpendicular to the stress axis ($CC'_3$) of the third strain gauge 14C (FIG. 4A). The second strain gauge 14C is positioned such that its stress axis ($CC'_2$) is located between both previous axes and is at an angle of 45° with the stress axis ($CC'_1$) and ($CC'_2$). The plurality of strain gauges 14 is, according to this example, a rectangular gauge rosette marketed under the trademark "Vishay" and having the reference C2A-13-125LR-350. It consists of a "constantan"-type copper and nickel metal alloy, and has a resistance equal to 350Ω, a thermal self-compensation (T.S.C.) of 13 corresponding to a thermal expansion coefficient of 23.2 ppm/° C. comparable to that of aluminium, and each strain gauge has a length equal to 3.18 mm, and a gate width equal to 1.78 mm.

Figure 5:
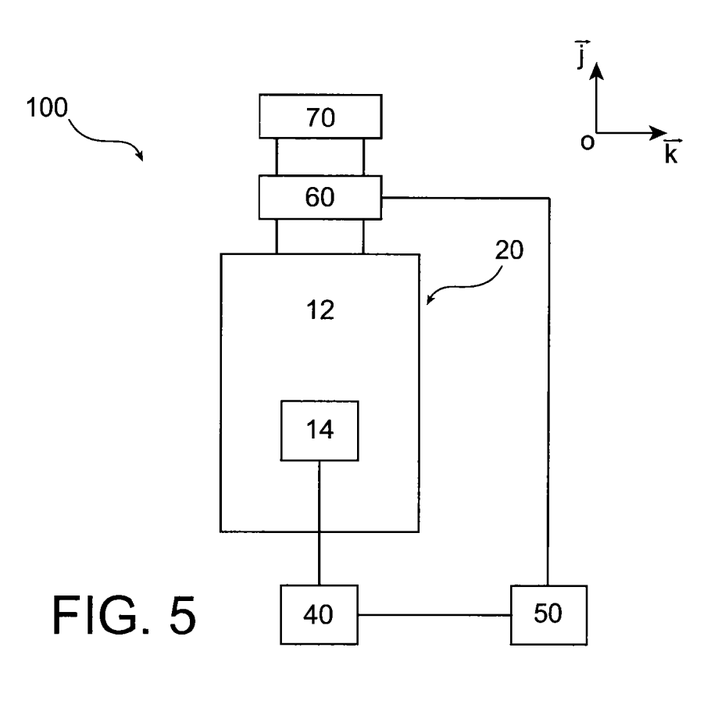
FIG. 5 represents a managing device attached on a pack comprising a lithium accumulator.

Each strain gauge can be connected to a voltage source powering it. Each gauge is connected to a measuring device 40 for measuring in real time (t) the strain $\varepsilon_x(t)$ undergone by this same gauge 14 (FIG. 5). The strain measurements are communicated to a calculating device 50, in the present case a computer having a device for storing reference values and a displaying device. The calculating device 50 enables calculations to be carried out from the measurements of the gauges and according to a chosen algorithm. Depending on the results of this algorithm, the calculating device can reversibly control opening or closing an electrical switch 60, connecting the electric voltage terminals from the pack 20 to its client environment 70. The term client environment designates all the conductive elements connected to the voltage terminals of the pack.

The exemplary managing device 100 described herein thus includes the devices 14, 40, 50 and 60 defined above (FIG. 5). In other words, the managing device 100 does not necessarily include the pack 20.

Figure 6:
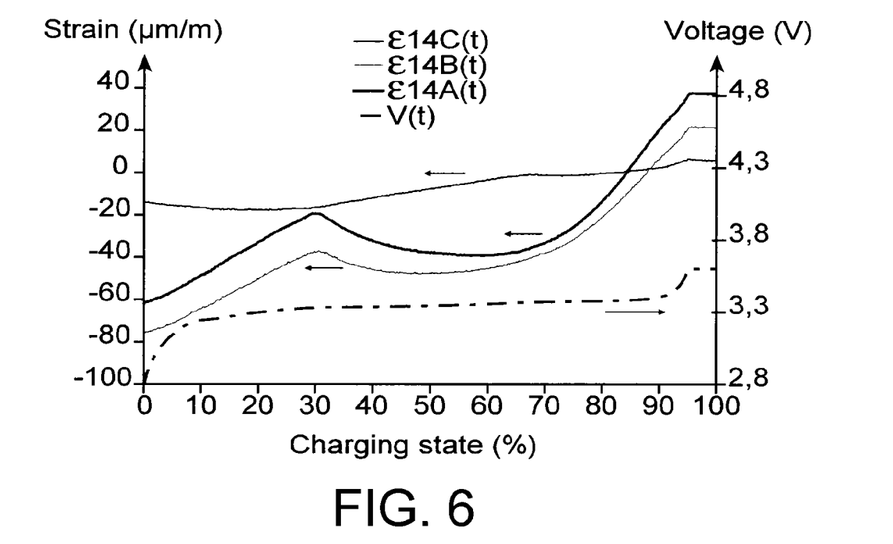
FIG. 6 represents measurements carried out by the plurality of strain gauges attached to a pack comprising a lithium accumulator without a mandrel, during a cycle of charging the element or pack.
Figure 7:
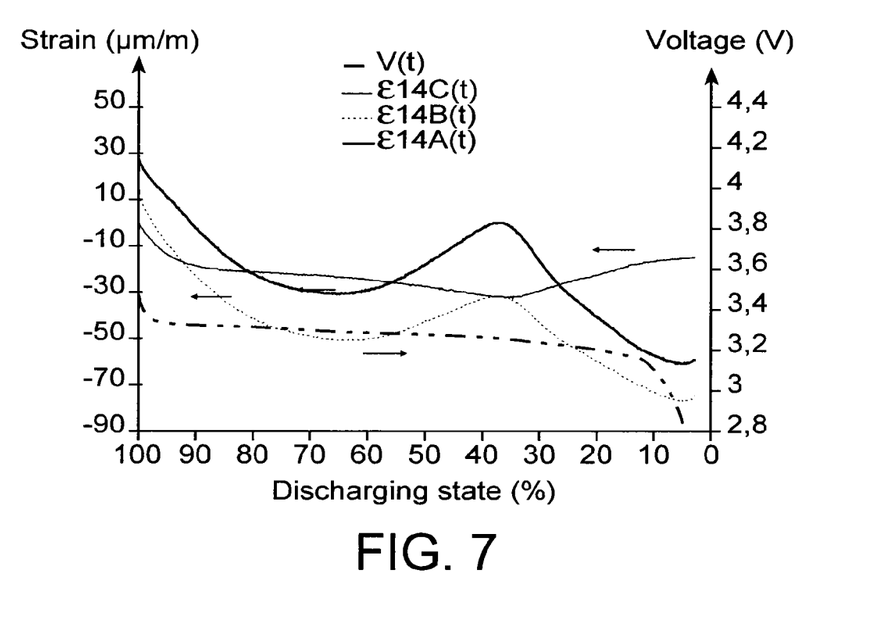
FIG. 7 represents measurements carried out by the plurality of strain gauges attached to a pack comprising a lithium accumulator without a mandrel, upon a cycle of discharging the element or pack.

The detailed disclosure now relates to the algorithm chosen. More precisely, this algorithm enables the managing device 100 to optimally manage the operation of the pack 20. The inventors have surprisingly noticed that the strains of the cover 12 of the pack 20, which are measured by the plurality of strain gauges 14 during charging and discharging cycles of said pack, are not linear. FIGS. 6 and 7 respectively represent the strains of the cover 12 measured by the gauges 14A, 14B and 14C during a charging and discharging cycle of the pack 20. It is clearly observed on these two figures that no series of measurements ($\varepsilon_{14A}(t)$, $\varepsilon_{14B}(t)$, $\varepsilon_{14C}(t)$) carried out by a same strain gauge, for a full charging or discharging cycle, is linear as a function of the charging state of the pack. Moreover, the amplitude of the measurements carried out by the strain gauges varies as a function of the orientation of their stress axis (see for example the measurements $\varepsilon_{14A}(t)$ and $\varepsilon_{14B}(t)$). The curve V(t) represents the evolution in the electric voltage at the terminals of the accumulator.

It is worth to note that these results are contrary to the technical teaching of document WO2011/072295 (FIG. 2), according to which there could be a linear relationship between the measurements of the stresses carried out by a strain gauge attached to a tape keeping several accumulators together, and the full state of charge of all the accumulators.

Figure 8:
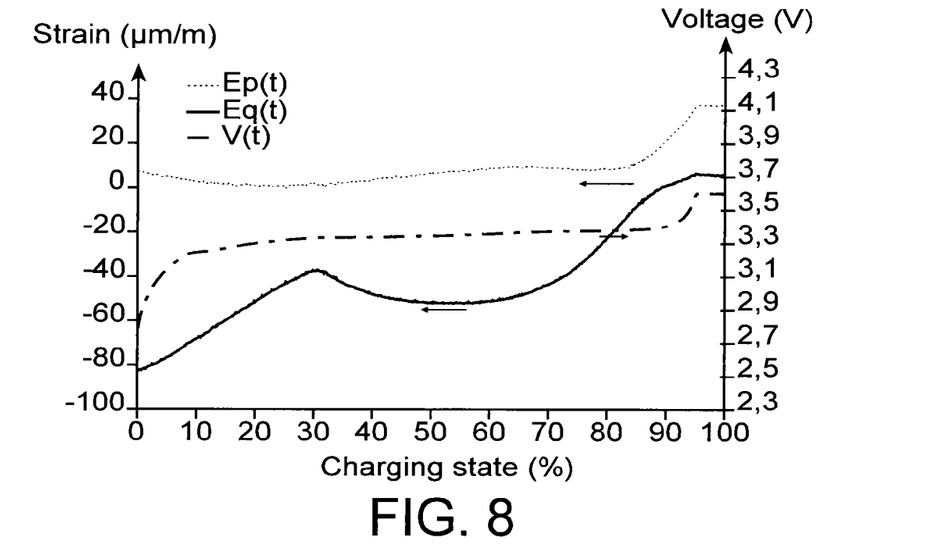
FIG. 8 represents the variation in the electric voltage at the terminals of a pack, comprising a lithium accumulator without a mandrel, and the variations in the maximum and minimum main strains of the cover, measured by the managing device during a cycle of charging the element or pack.
Figure 9:
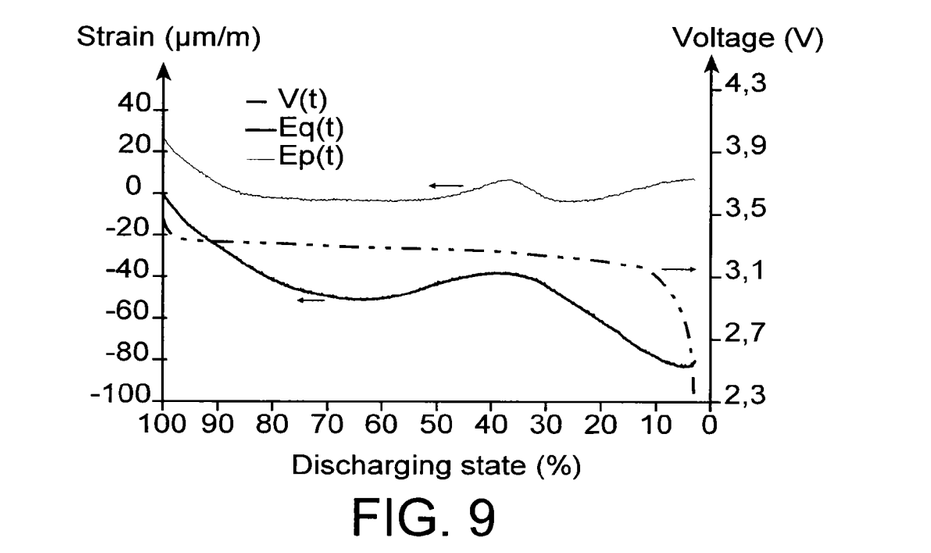
FIG. 9 represents the variation in the electric voltage at the terminals of a pack, comprising a lithium accumulator without a mandrel, and the variations in the maximum and minimum main strains of the cover, measured by the managing device during a cycle of discharging the element or pack.

For each gauge, the inventors desired to get rid of the amplitude variation in the measurements provided by this strain gauge as a function of the positioning of its stress axis on the cover 12. For this, they have calculated the strain amplitude along the axis of maximum strains Ep(t) and the strain amplitude along the axis of minimum strains Eq(t) of the cover 12, during the previous charging and discharging cycles (FIGS. 8 and 9). The strain amplitude along the axis of maximum strains Ep(t) is calculated according to the following equation 1:

$$Ep(t) = \frac{\varepsilon_{14A}(t) + \varepsilon_{14C}(t)}{2} + \frac{1}{\sqrt{2}} \sqrt{\frac{(\varepsilon_{14A}(t) - \varepsilon_{14B}(t))^2 + }{(\varepsilon_{14B}(t) - \varepsilon_{14C}(t))^2}}$$

The strain amplitude along the axis of minimum strains Eq(t) is calculated according to the following equation 2:

$$Eq(t) = \frac{\varepsilon_{14A}(t) + \varepsilon_{14C}(t)}{2} - \frac{1}{\sqrt{2}} \sqrt{\frac{(\varepsilon_{14A}(t) - \varepsilon_{14B}(t))^2 + }{(\varepsilon_{14B}(t) - \varepsilon_{14C}(t))^2}}$$

It can be noted in FIG. 8 that during a charging cycle, the curve associated with the minimum strains (Eq(t)) evolves substantially linearly between 0% and 30% of the accumulator 2 charging. Beyond this, the curve Eq(t) decreases up to 60% of the charging, and then increases again up to 100% of the charging of the accumulator.

The reverse phenomenon is observed during a discharging cycle of the accumulator 2 (FIG. 9). The evolution of the curve associated with the maximum strains (Ep(t)) is similar to that of the curve Eq(t), but it is of a more reduced amplitude. Depending on the slope of the curves Eq(t) and Ep(t), it can thus be identified whether the accumulator 2 in the pack 20 is in a charging or discharging cycle.

For a charging cycle, between 0 and 20% and between 75% and 90% of the charging state of the accumulator, the curves Eq(t) and Ep(t) evolve substantially linearly (FIG. 8). It is worth to note that the electric voltage curve (V(t)) measured at the terminals of the pack 20 has also a linear behaviour, but on more reduced ranges of the charging state: between 0 and 10% and between 95 and 100%. These behaviours are also observable for curves Eq(t), Ep(t) and V(t) during a discharging cycle of the pack (FIG. 9).

To determine the charging state of the pack 20 on wider charging ranges, the inventors have thought to correlate the information of the curves Eq(t), Ep(t) and V(t). Table 1 below shows that this correlation does not enable the charging state of the accumulator 2 to be known with certainty for some ranges of the charging values. Indeed, the following ranges of the charging state cannot be differentiated from these measurements only: between 20% and 30% and between 55% and 75%.

TABLE 1

Determination of the charging state of the pack

| Charging state of the pack (%) | Evolution of the curve Eq(t) | Evolution of the curve V(t) | Determination of the charging state of the pack |
|---|---|---|---|
| 0 to 20% | ↗ | strong ↗ | Yes |
| 20 to 30% | ↗ | low ↗ | Indeterminate |
| 30 to 55% | ↘ | low ↗ | Yes |
| 55 to 75% | ↗ | low ↗ | Indeterminate |
| 75 to 100% | ↗ | strong ↗ | Yes |

The same is true as regards a discharging cycle as shown in table 2. It is not possible to distinguish from the previous measurements the following ranges of charging state: between 82% and 64% and between 38% and 25%.

TABLE 2

Determination of the discharging state of the pack

| Charging state of the pack (%) | Evolution of the curve Eq(t) | Evolution of the curve V(t) | Determination of the discharging state of the pack |
|---|---|---|---|
| 100 to 82% | ↘ | strong ↘ | Yes |
| 82 to 64% | ↘ | low ↘ | Indeterminate |
| 64 to 38% | ↗ | low ↘ | Yes |
| 38 to 25% | ↘ | low ↘ | Indeterminate |
| 25 to 0% | ↘ | strong ↘ | Yes |

The inventors have thought to solve these indeterminations by calculating the slope of the curve Ep(t). Indeed, the inventors have noticed that this slope varies as a function of the charging ranges involved. For this, a charging and discharging cycle is carried out in the charging or discharging indeterminate ranges, to obtain a sufficient number of measurements in order to distinguish these ranges of values. According to this solution, the measurement of V(t) and the calculation of Eq(t) are performed, as well as dEq(t)/dt and the correlation of these three different data (Eq(t), dEq(t)/dt, V(t)). Although this solution is technically feasible, the inventors have wished to use an algorithm enabling the charging state of the pack 20 to be more quickly and simply determined.

The inventors have chosen to use the measurements carried out by the strain gauges 14A, 14B and 14C to represent the evolution in the stresses of the cover 12, by graphical representation, according to the Mohr circle. The abscissa d(t) of the Mohr circle is calculated according to the following equation 3:

$$d(t) = \frac{\varepsilon_{14A}(t) + \varepsilon_{14C}(t)}{2}$$

The radius r(t) of the Mohr circle is calculated according to the following equation 4:

$$r(t) = \frac{1}{\sqrt{2}} \sqrt{(\varepsilon_{14A}(t) - \varepsilon_{14B}(t))^2 + (\varepsilon_{14B}(t) - \varepsilon_{14C}(t))^2}$$

The values d(t) and r(t) are calculated in real time, by the calculating device 50. In other words, the algorithm comprises a step of calculating d(t) and r(t).

The algorithm includes another calculating step enabling the couple of values (d(t), r(t)) calculated to be compared with a list of couples of reference values ($d_r$, $r_r$). When the couple of values (d(t), r(t)) calculated corresponds to a couple of reference values, called a critical couple ($d_{rc}$, $r_{rc}$), the calculating device controls opening or keeping open the electrical switch 60 so as to electrically insulate the pack 20 from its client environment 70. Conversely, when the couple of values (d(t), r(t)) calculated corresponds to a couple of reference values, called a normal couple ($d_{rn}$, $r_{rn}$), the calculating device controls closing or keeping close the electrical switch 60, so as to electrically connect the pack 20 to its client environment 70.

Figure 10:
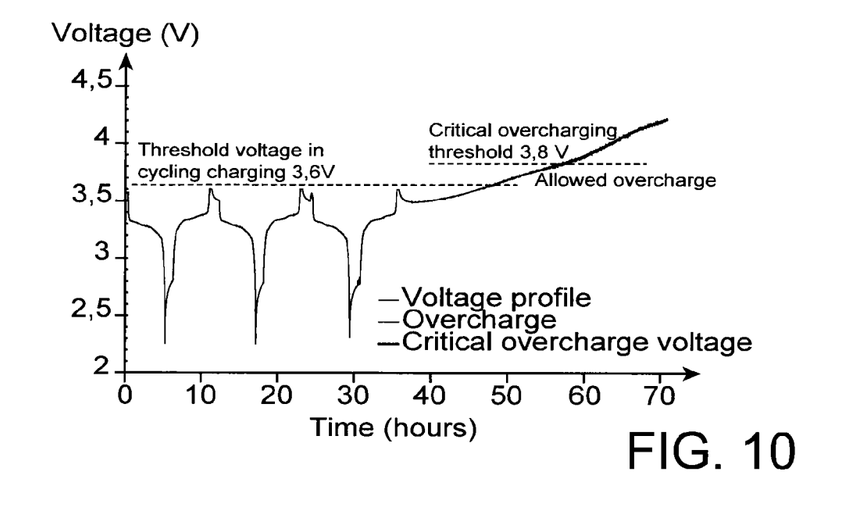
FIG. 10 represents the variation in the electric voltage at the terminals of a pack, comprising a lithium accumulator without a mandrel, during several cycles of discharging and charging.

A method for calibrating a managing device 100 as described above is now described, in view of determining the normal and critical reference values. More precisely, a method enabling the couples of reference values of the managing device 100 attached to a control pack 20 to be determined is described (FIG. 5). The control pack is charged and discharged under normal and abnormal operating conditions, such that each couple of values (d(t), r(t)) measured is able to be associated with a couple of critical or normal reference values. Abnormal operating conditions of the control pack 20 are defined as conditions appearing in a safety state (see above). According to an exemplary calibrating method hereinbelow, the accumulator 2 of the control pack (of the "A123Systems" type and marketed under the reference ANR26650-M1, having a rated capacity Cn=2 300 mAh) undergoes 3 charging and discharging cycles at a current regime of Cn/5h between 2 voltage thresholds of 3.6V upon charging (as recommended by the manufacturer) and 2.3V upon discharging (FIG. 10). An overcharging at the end of the third cycle is imposed by applying a low charge current such that the voltage of the element exceeds the end of charge voltage recommended by the manufacturer (3.6V). The voltage of the element thus slowly increases to reach an allowed overcharge zone between 3.6V and 3.8V, and then a critical overcharge zone for a voltage higher than 3.8V.

During these cycles, the device 50 calculates in real time the couples of values (d(t), r(t)) and stores these values in storage means. At each instant, using FIG. 10, it can also be identified in which state is the accumulator: normal charging, normal discharging, critical overcharging, critical discharging. To each couple of values (d(t), r(t)), using FIG. 10, the state corresponding to the accumulator state can thus be associated.

The couples of values (d(t), r(t)) can be graphically represented in an investigation graph, that is an orthogonal reference frame including in abscissa the values d(t) and in ordinate the values r(t). In other words, the couples of values (d(t), r(t)) can be the coordinates of an investigation curve f(t) drawn in real time in the investigation graph.

Figure 11:
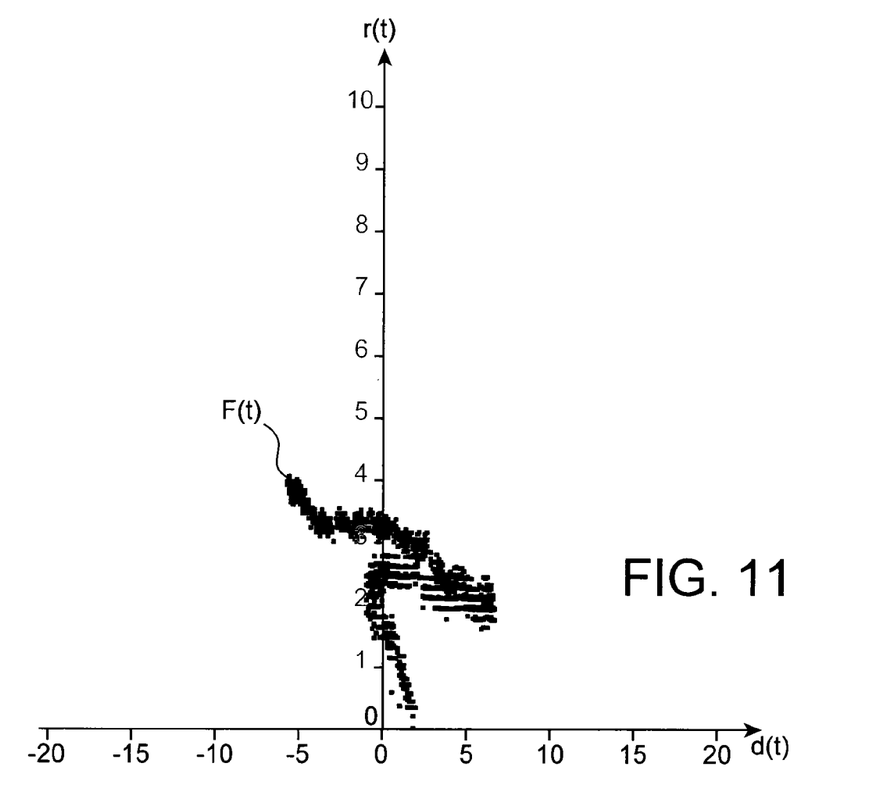
FIG. 11 represents the variation in an investigation function upon a discharging of a pack comprising a lithium accumulator without a mandrel.
Figure 14:
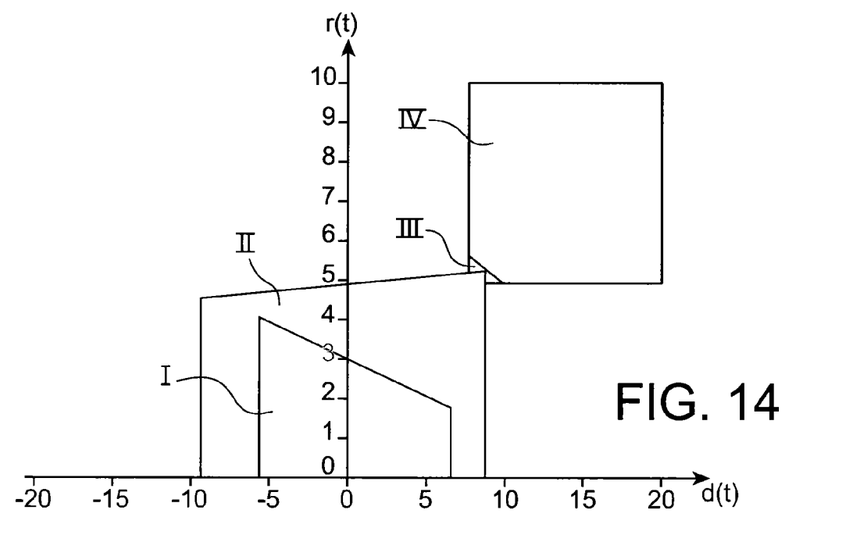
FIG. 14 represents zones in which an investigation function evolves as a function of the state of a pack comprising a lithium accumulator without a mandrel.

FIG. 11 represents the evolution in the investigation curve f(t) during discharging cycles carried out between 0 and 5 hours, 12 and 17 hours, 24 and 29 hours on the graph of FIG. 10. During this cycle, the values d(t) decrease and the values r(t) increase. The investigation function f(t) increases moving away to the left of the ordinate axis. The control pack is discharged several times so as determine a zone on the investigation graph corresponding to a normal discharging behaviour of the pack. According to the present example, this zone I of normal discharging is between (d=−5.56; r=4.01) and (d=6.61; r=1.77) (FIG. 14).

Figure 12:
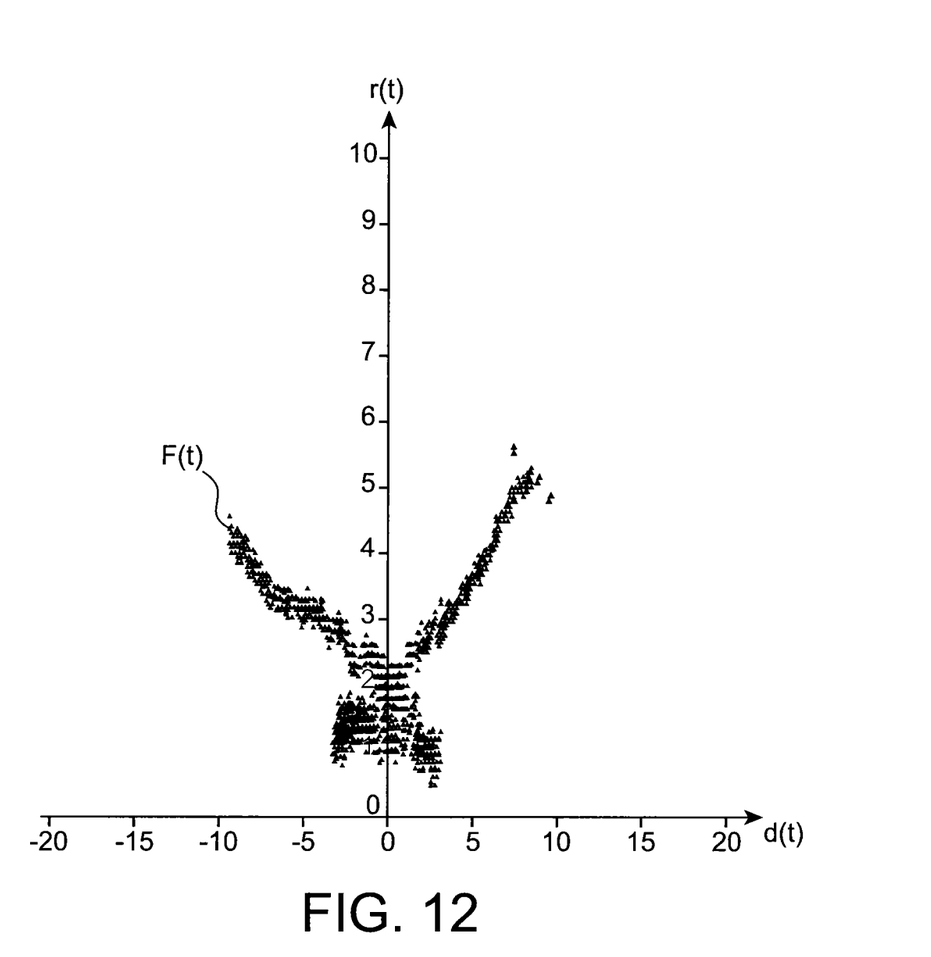
FIG. 12 represents the variation in an investigation function upon a charging of a pack comprising a lithium accumulator without a mandrel.

FIG. 12 represents the evolution in the investigation curve f(t) during all the three charging cycles with the cut-off voltage threshold 3.6V made between 6 and 11 hours, 18 and 23 hours, 30 and 35 hours and the allowed overcharging between 35 and 55 hours up to the maximum voltage recommended by the manufacturer (3.8V) on the graph of FIG. 10. It is observed that the values d(t) increase and the values r(t) decrease for a normal charging state, and that the values d(t) and r(t) increase for an allowed overcharging state (FIG. 12). The zone of the investigation graph corresponding to the normal charges (voltages lower than 3.6V) corresponds to a zone II of normal charges between (d=−9.39; r=4.57) and (d=8.47; r=5.30) (FIG. 14). The zone III corresponding to the allowed overcharges (voltages between 3.6V and 3.8V) corresponds to a zone of allowed overcharges between (d=9.62; r=4.88) and (d=7.42; r=5.62) (FIG. 14).

Figure 13:
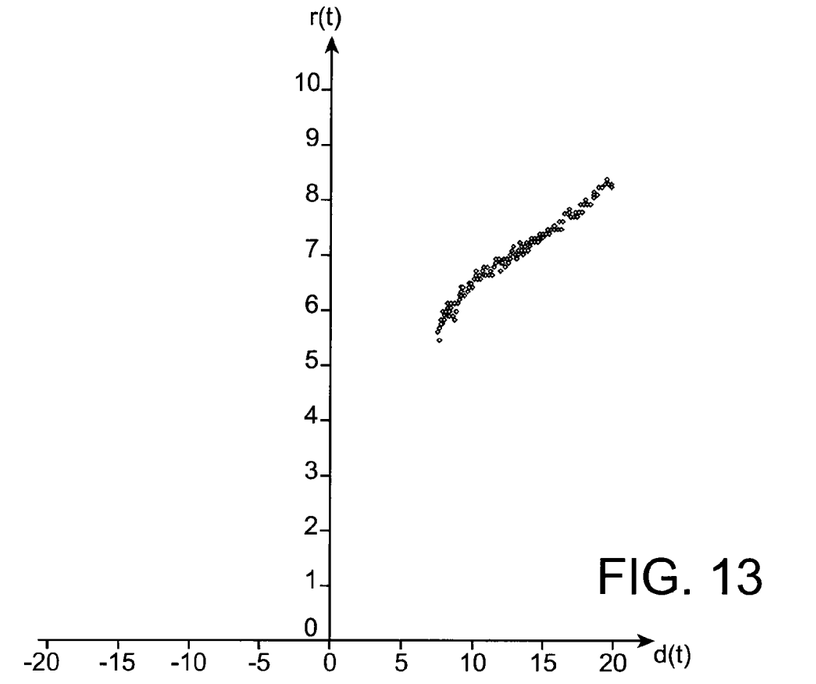
FIG. 13 represents the variation in an investigation function upon a critical overcharging of a pack comprising a lithium accumulator without a mandrel.

When the charge current is maintained, which results in increasing the voltage to its maximum value, that is beyond the recommended maximum charging cut-off threshold of 3.8V, it is noticed that the investigation function f(t) exits from the allowed zone of overcharges (FIG. 13). The zone IV of critical overcharges corresponds to a zone beyond (d=7.65; r=5.45) (FIG. 14). In other words, the zone of critical overcharges corresponds to a zone defined by d>7.65 and r>5.45.

An allowed overdischarge zone and an unallowed or critical overdischarge zone can be determined in the same way. For the sake of clarity, these zones are not represented in the figures.

The investigation function f(t) advantageously enables the state of the control pack to be simply graphically represented in real time. As a function of the position of the investigation curve f(t) in one of the zones above, it can be known in which state the pack is: state of charge or safety state (FIG. 14).

Figure 15:
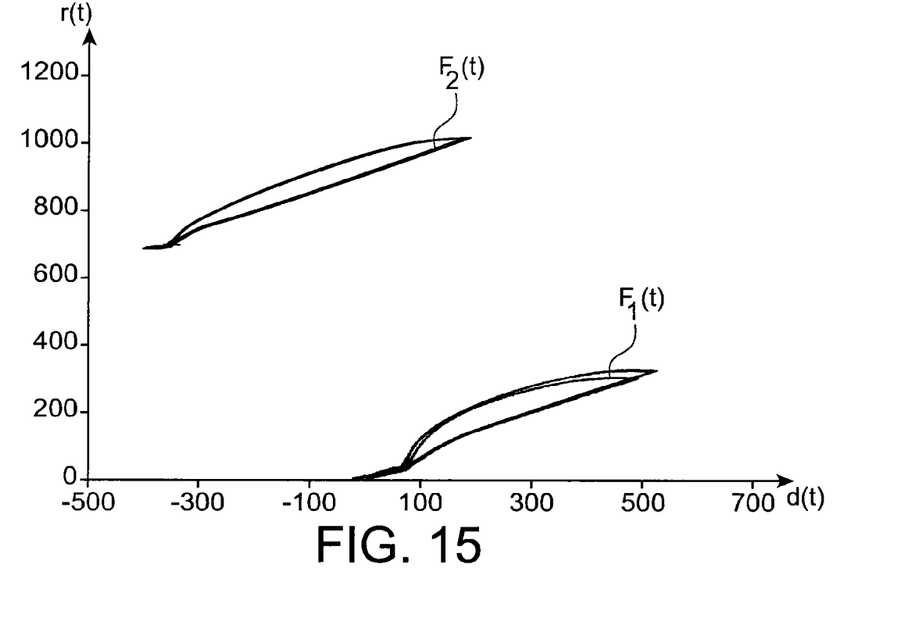
FIG. 15 represents several investigation functions corresponding to different charging cycles of a pack comprising a lithium accumulator with a mandrel, each charging cycle being spaced by several hundreds of cycles.

Therefore, it has been observed that the position of the investigation function f(t) in the investigation graph changes as a function of the number of operating cycles of the control pack. This phenomenon is illustrated in FIG. 15 for 3 normal charging and discharging cycles of a $LiCoO_2$—$LiMn_2O_4$/C type accumulator with a mandrel, made before and after making a number of operating cycles. The element considered is this time a "Samsung" element under the reference ICR 18650-30A with a rated capacity Cn 3 000 mAh and a rated voltage 3.78V. Its dimensions are a length of 65 mm and a diameter of 18 mm, for a weight of 48 g. The gauge used in the example set forth herein is a triangular gauge rosette of the trademark "Vishay" and referenced C2A-06-062LR-120, consisting of a copper and nickel metal alloy, constantan. It has a 120Ω resistance, a 06 thermal self-compensation (TSC) corresponding to a 11.3 ppm/° C. thermal expansion coefficient identical to the expansion coefficient of steel. Each gauge of the rosette has a 1.52 mm length and a 1.27 mm gate width.

It can be observed in this figure that when the accumulator is new, the investigation function $f_1(t)$ lies within a zone delimited by values of d(t) between −10 and 515, and by values of r(t) between 0 and 330. After 145 charging and discharging cycles, the function $f_2(t)$ moves to a second zone of the investigation graph, which is delimited by values of d(t) between −400 and 185, and by values of r(t) between −685 and 1 020. The movement of the function f(t) in the investigation graph thus enables the state of health of the accumulator to be followed up in real time. In the same way as previously, an operator can associate an aging state of the control pack to each calculated couple of values (d(t); r(t)).

From the calibrating method described above, it is possible to determine the previously mentioned couples of reference values ($d_r$; $r_r$). More precisely, couples of values (d(t); r(t)) calculated by the managing device 100 attached on the control pack (FIG. 5) are referenced as being:
  normal ($d_{rn}$, $r_{rn}$) when they belong to the zone of normal discharges or the zone of normal charges or the zone of allowed overcharges or the zone of allowed overdischarges; or
  critical ($d_{rc}$, $r_{rc}$) when they do not belong to one of the zones defined above.

In this way, the managing device 100 is suitable for being used with packs 20 identical or similar to the control pack.

A method for using a managing device 100 is now described. It is reminded that a managing device according to the invention includes means 14, 40, 50, 60 described above (FIG. 5). An exemplary method for using a managing device can include the following steps, carried out in any order:
  attaching the plurality of strain gauges 14 on a cover 12 of a pack 20;
  connecting the electrical switch 60 to at least one voltage terminal of the pack 20;
  switching on the calculating device 50 such that the algorithm chosen above can be carried out.

Variants of the exemplary managing device 100 are now described.

The strain gauges can be made of, or include one, piezoelectric material which creates an electric voltage measurable when it is deformed.

Figures 4B, 4C:
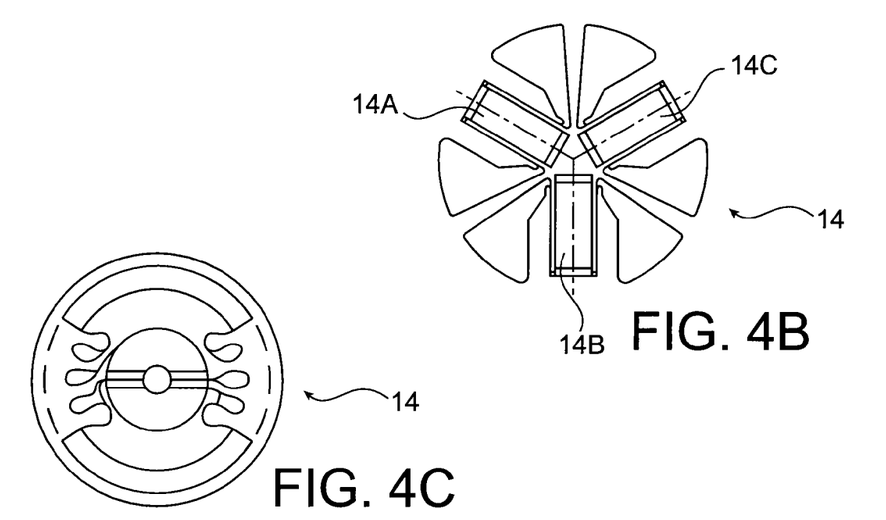

The strain gauges 14A, 14B, 14C can also be arranged such that their stress axes form angles making the calculation of the values d(t) and r(t) easier. The stress axes of the gauges can for example form between them angles with simple values, such as 45°, or 60° or 120°. The gauges can be arranged according to a delta rosette-type geometry (FIG. 4B) or according to the arrangement represented in FIG. 4C.

The plurality of strain gauges 14 can also be a rectangular gauge rosette characterized by a gauge rated factor and a maximum strain corresponding to the strain amplitudes to be measured, a resistance and an expansion coefficient. To improve the accuracy in the strain measurements of the strain gauges above, regardless of the temperature and without having to have a temperature controlling system for each gauge, it is also possible to add a free gauge (which does not undergo the influence of temperature) attached on a support plate of the same nature as that on which the measurement gauge is attached and to subtract its response to the strains recorded by the other gauges. It is also possible to measure the room temperature using a temperature probe, and then to apply a correction to the strain values measured by the strain gauges after calibration ("blank" measurement of the gauge strain as a function of temperature).

According to another variant, as regard the calculating device 50, it can include a viewing interface enabling a user of the pack 20 to view the investigation function f(t) in real time.

The calculating device 50 can also include a keyboard type interface, enabling the user of the pack 20 to monitor the charging state and/or discharging state of the accumulator as a function of the behaviour of the function f(t) in the investigation graph.

According to one application, the managing device 100 can be attached on a pack 20 comprising a cylindrical or prismatic shape accumulator 2.

Figure 16:
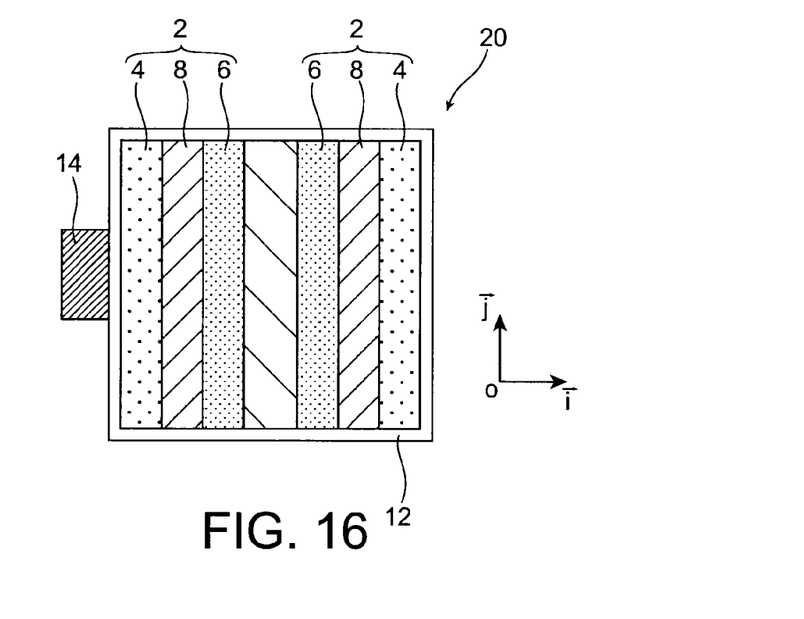
FIG. 16 represents a profile cross-section of a plurality of strain gauges attached to a pack cover comprising a lithium accumulator with a mandrel.

According to another exemplary application, the managing device 100 can also be attached on a pack 20 comprising a lithium accumulator 2 cylindrical in shape, of the $LiMn_2O_4$—$LiCoO_2$/graphite (LMO-LCO/G) type. The accumulator can be wound around a centre core or mandrel 10 of plastic or metal (FIG. 16). The pack herein described can for example be marketed under the trademark "Samsung" under the reference ICR 18650-30A, comprising an accumulator characterized by a 3 000 mAh rated capacity and a 3.78V rated voltage. The dimensions of the element are a length of 65 mm along the direction (0; j) and a diameter of 18 mm along the direction (0; i), for a weight of 48 g.

According to yet another application, a pack 20 can include several accumulators, the connection terminals of which are connected to the connection terminals of the pack. Each accumulator can include its own managing device 100, so as to be able to electrically connect or disconnect said accumulator from the pack. More precisely, the electrical switch 60 of each accumulator is connected between a connection terminal of this accumulator and a connection terminal of the pack so as to connect or disconnect both terminals, in a reversible manner.

According to yet another application, the strain gauges can be bonded or attached to the inside of the protecting cover 12, or on a metallic collector external to the accumulator 2. The strain gauges 14A, 14B and 14C can for example be bonded on an inner face of the cover or on the metallic collector external to the accumulator or on a metal sheet supporting the electrode of the last winding of the accumulator 2 or on the last layer of an accumulator prismatic in shape. The gauges can also be bonded on a plastic cover or a film enabling the element making of the accumulator 2 to be held together.

The detailed disclosure now describes several variants of the method for using the managing device 100.

Figure 17:
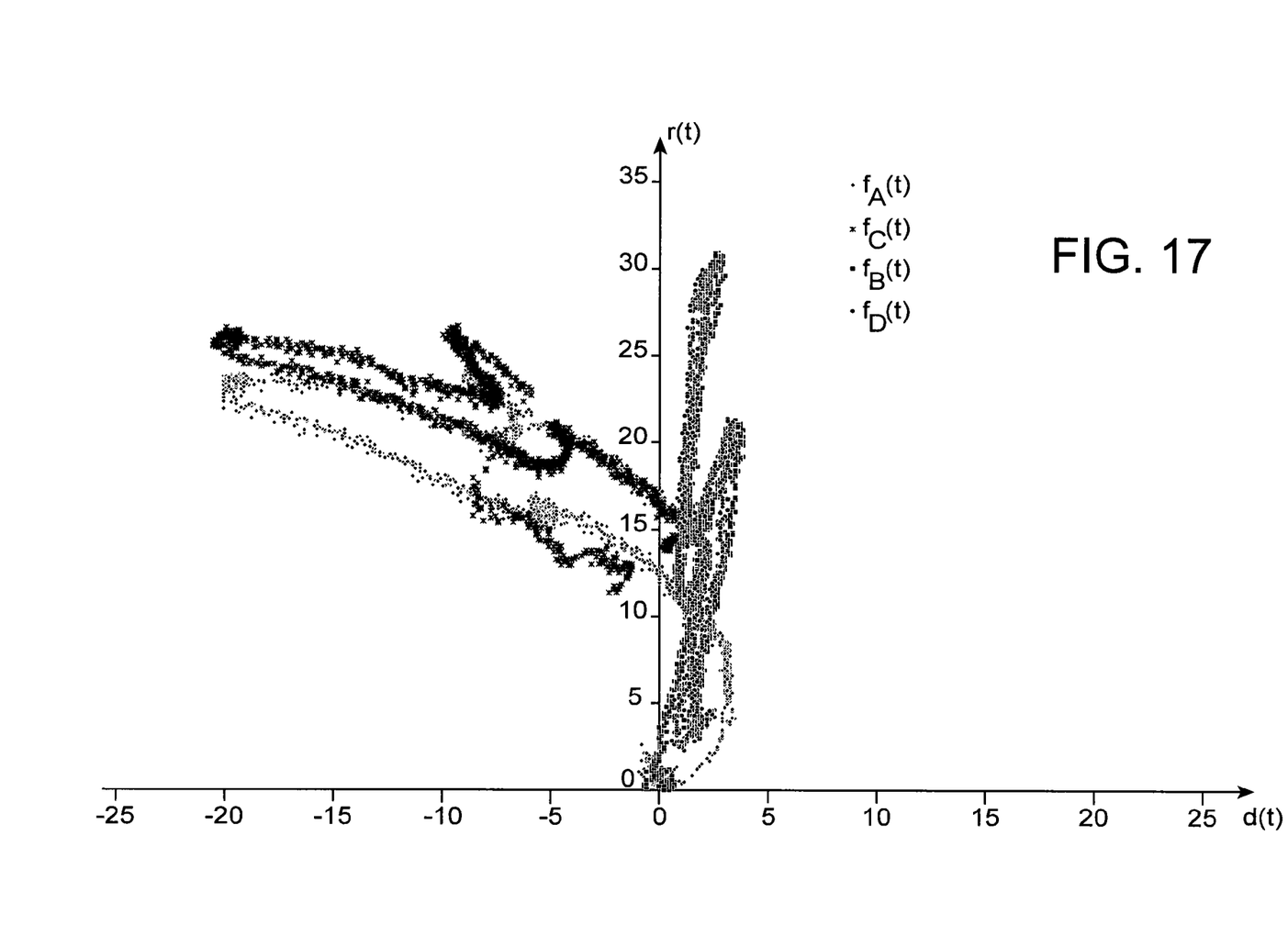
FIG. 17 represents several investigation functions of a plurality of strain gauges on the cover of an element for two different accumulators without a mandrel.

The optimum position of the plurality of strain gauges 14 on the cover 12 of the pack 20 can be empirically determined for each type of the pack 20. Indeed, it has been noticed that the behaviour of the investigation function f(t) substantially varies as a function of the position of the device of the strain gauges on a same pack. In FIG. 17, is represented, for a first charging and discharging cycle, the behaviour of an investigation function corresponding to the positioning of the strain gauge device 14 at half the length the pack $f_A(t)$ and at one of the connection terminals of the pack: $f_B(t)$. It is also represented, in FIG. 17, the behaviour of an investigation function corresponding to a third operating cycle of the pack when the strain gauge device 14 is half length f$_C$(t) and at the connection terminals f$_D$(t) of the same pack.

It has also been observed that the behaviour of the investigation function substantially varies as a function of the nature of the materials making up the accumulator, the quantity of active material per unit area (basis weight), the accumulator shape, the number of windings and the number of stacks of the elements making up the accumulator, whether a mandrel is present or not in the centre of the winding, the shape and nature of the pack cover (plastic, stainless steel, aluminium or else), etc.

For example, a cylindrical accumulator wound around a mandrel (FIG. 16) more sharply deforms the protecting cover 12 of the pack 20.

Conversely, when the accumulator 2 does not include a centre mandrel, the volume expansion occurs towards the inside and towards the outside of the winding; hence, the strains recorded by the strain gauges reflect less faithfully the strains undergone by the accumulator 2. In other words, the presence of a centre mandrel in a cylindrical accumulator enables more precise information about its state to be obtained with respect to a same accumulator not including a mandrel.

It has also been noticed that the variations in the strains of the strain gauges are more significant when said gauges are bonded to a discharged accumulator. It is thus recommended to conduct attaching the strain gauges on the pack cover or on the accumulator present in the cover, when the accumulator is in a discharged or fully discharged state.

In conclusion, the invention relates to a device for managing a pack comprising a lithium accumulator or any other accumulator type having a comparable design (nickel-cadmium or nickel metal hydride for example), as well as a method for using said device. Thanks to the managing device, it is possible to follow up in real time the state of charge or safety of the pack, as well as its aging state. From these information, the managing device monitors the interface between the pack and its client environment so as to avoid an abusive use of the pack, likely to irreversibly deteriorate it or have risks for its environment. The actions of the managing device are advantageously reversible at the pack and do not degrade it.

The invention claimed is:

1. A device for managing an accumulator, comprising:
   a plurality of strain gauges including at least three strain gauges, the strain gauges being configured to measure stresses along at least three distinct stress axes;
   circuitry configured to measure strains undergone by each gauge along its stress axis;
   a reversible electrical switch;
   a processor configured to determine a state of charge of the accumulator based on the measured strains and configured to control opening and closing of the reversible electrical switch, depending on the determined state of charge of the accumulator.

2. A device for managing an accumulator according to claim 1, the processor including storage storing a first series of values and a second series of values being different from the first series of values, the processor controlling:
   closing the reversible electrical switch when the measured strains belong to the first series of values; and
   opening the reversible electrical switch when the measured strains belong to the second series of values.

3. A device for managing an accumulator according to claim 2, the processor configured to implement an algorithm comprising calculating evolution of the stresses measured by the plurality of strain gauges.

4. A device for managing an accumulator according to claim 3, the processor configured to implement an algorithm identifying a result of the evolution of the stresses, measured by the plurality of strain gauges, in the first series of values or in the second series of values stored by the storage.

5. A device for managing an accumulator according to claim 4, the calculating the evolution of the stresses comprising calculating the abscissa and the radius of the Mohr circle at a time t.

6. A device for managing an accumulator according to claim 1, the plurality of strain gauges being held in contact with a cover including a connection terminal, and including at least one accumulator including at least one connection terminal, such that the strain gauges measure mechanical stresses exerted on the cover.

7. A device for managing an accumulator according to claim 6, the connection terminal of the cover being connected to the reversible electrical switch and to the connection terminal of the accumulator.

8. A device for managing an accumulator according to claim 6, the accumulator being wound around a mandrel.

9. A device for managing an accumulator according to claim 6, the accumulator being a lithium accumulator.

10. A device for managing an accumulator according to claim 6, wherein the device is included in a pack comprising the cover including the connection terminal, connected to the connection terminals belonging to at least two accumulators contained in the cover, the device corresponding to one of the accumulators.

11. A method for calibrating a managing device according to claim 6, comprising recording a first series of measurements, on a storage included in the processor, the measurements being carried out by the circuitry, upon charging and discharging an accumulator, to maintain integrity of the accumulator.

12. A method for calibrating a managing device according to claim 11, further comprising recording a second series of measurements, on the storage included in the processor, the measurements being carried out by the circuitry, upon charging and discharging an accumulator, to prevent an irreversible damage of the integrity of the accumulator.

* * * * *